United States Patent
Li et al.

(10) Patent No.: US 10,136,277 B2
(45) Date of Patent: Nov. 20, 2018

(54) METHOD AND DEVICE FOR ROAMING CHARGING FOR CS FALLBACK MTRF CALL

(71) Applicant: Alcatel Lucent, Boulogne Billancourt (FR)

(72) Inventors: Xiangyang Li, Shanghai (CN); Yigang Cai, Naperville, IL (US)

(73) Assignee: ALCATEL LUCENT, Boulogne Billancourt (FR)

( * ) Notice: Subject to any disclaimer, the term of this patent is extended or adjusted under 35 U.S.C. 154(b) by 0 days.

(21) Appl. No.: 14/420,798

(22) PCT Filed: Aug. 7, 2013

(86) PCT No.: PCT/IB2013/001984
§ 371 (c)(1),
(2) Date: Feb. 10, 2015

(87) PCT Pub. No.: WO2014/024037
PCT Pub. Date: Feb. 13, 2014

(65) Prior Publication Data
US 2015/0304832 A1  Oct. 22, 2015

(30) Foreign Application Priority Data
Aug. 10, 2012 (CN) .......................... 2012 1 0285369

(51) Int. Cl.
*H04W 4/24* (2018.01)
*H04M 15/00* (2006.01)
*H04W 84/04* (2009.01)

(52) U.S. Cl.
CPC ............. *H04W 4/24* (2013.01); *H04M 15/41* (2013.01); *H04M 15/43* (2013.01); *H04M 15/44* (2013.01);
(Continued)

(58) Field of Classification Search
CPC ...... H04M 15/41; H04M 15/43; H04M 15/44; H04M 15/8038; H04W 4/24; H04W 84/042
(Continued)

(56) References Cited

U.S. PATENT DOCUMENTS

2004/0210524 A1* 10/2004 Benenati ............. G06Q 20/102
705/40
2009/0264097 A1* 10/2009 Cai ........................ G06Q 30/04
455/406

(Continued)

FOREIGN PATENT DOCUMENTS

CN  102137374  7/2011
JP  9-172508 A  6/1997
(Continued)

OTHER PUBLICATIONS

Alcatel-Lucent, "Mobile Terminating Roaming Forwarding (MTRF) charging for Roaming scenarios," 3$^{rd}$ Generation Partnership Project (3GPP), 3GPP TSG SSA WG5 (Telecom Management) Meeting #81, S5-120154, pp. 1-2, XP050579318, Dresden, Germany, Feb. 6-10, 2012.
(Continued)

*Primary Examiner* — Kamran Afshar
*Assistant Examiner* — Farid Seyedvosoghi
(74) *Attorney, Agent, or Firm* — Fay Sharpe LLP

(57) ABSTRACT

A method and device for charging roaming for CS fallback MTRF call is provided. At least one charging data record is obtained through receiving charging data records from at least one roaming charging device, wherein the user equipment roams to a VPLMN corresponding to the at least one roaming charging device. Based on the at least one charging data record and in combination with the local charging data record in the home charging device, consolidation process-
(Continued)

ing is performed so as to obtain a consolidated target charging data record. A method of computing charging data records so as to perform final charging in a home charging device in the home network is introduced, instead of performing final charging in a roaming charging device in a visited network, which avoids repetitive charging on the charging data records in the mobile switching center of the visited network.

8 Claims, 8 Drawing Sheets

(52) U.S. Cl.
CPC ...... *H04M 15/8038* (2013.01); *H04W 84/042* (2013.01)

(58) Field of Classification Search
USPC .................................. 455/406, 408; 705/40
See application file for complete search history.

(56) References Cited

U.S. PATENT DOCUMENTS

| | | | |
|---|---|---|---|
| 2010/0087191 A1* | 4/2010 | Kocsis | H04L 63/0853 455/433 |
| 2011/0184961 A1 | 7/2011 | Aertebjerg et al. | |

FOREIGN PATENT DOCUMENTS

| | | |
|---|---|---|
| JP | 11-205387 A | 7/1999 |
| JP | 2003-309672 A | 10/2003 |
| WO | WO 2007/079682 | 7/2007 |
| WO | WO 2014/029409 A1 | 2/2014 |

OTHER PUBLICATIONS

Miikka Poikselka et al., "VoLTE End to End and Signalling," Voice Over LTE, pp. 99-215, XP055082307, 2012.
SA5, "Reply to LS on Charging in CS FallBack Mobile Terminating Roaming Forwarding," 3$^{rd}$ Generation Partnership Project (3GPP), 3GPP TSG SSA WG5 (Telecom Management) Meeting #85, SA5-122467; pp. 1-2, XP050688992, Kyoto, Japan; Oct. 8-12, 2012.
International Search Report for PCT/IB2013/001984 dated Jun. 26, 2014.
English Bibliography for Japanese Patent Application Publication No. JP9172508A, published Jun. 30, 1997, printed from Derwent Innovation on Apr. 24, 2018, 4 pp.
English Bibliography for Japanese Patent Application Publication No. JP11205387A, published Jul. 30, 1999, printed from Derwent Innovation on Apr. 24, 2018, 4 pp.
English Bibliography for Japanese Patent Application Publication No. JP2003309672A, published Oct. 31, 2003, printed from Derwent Innovation on Apr. 24, 2018, 4 pp.
3GPP TS 32.250 V10.3.0 (Dec. 2011); Telecommunication Management; Charging Management; Circuit Switched (CS) domain charging (Release 10), 105 pp.
PCT Pat. App. PCT/IB2013/001984, Written Opinion of the International Searching Authority, dated Jun. 26, 2014, 8 pp.

* cited by examiner

METHOD AND DEVICE FOR ROAMING CHARGING FOR CS FALLBACK MTRF CALL

TECHNICAL FIELD

The present invention relates to the field of communications technology, and more specifically, to a technology for roaming charging for CS fallback MTRF call.

BACKGROUND TECHNOLOGY

On the basis of the existing 2G and 3G, the 3GPP launches an evolved packet system EPS. During the preliminary period of building an EPS network, if an operator already has a mature GERAN/UTRAN network, the operator may adopt an existing CS voice solution to provide voice services for the sake of CS (circuit switched) investment protection and LET/EPC deployment policy.

CSFB (CS Fallback) is one of the outcomes of the CS over PS task in 3GPP R8. The background of the task is that a radio module of an LTE and CS dual-mode terminal is a single radio mode, i.e., a dual-mode or multi-mode terminal having LTE and UTRAN/GERAN access capabilities cannot receive/transmit circuit domain service signals when using LTE access. A CSFB technology is evolved so as to enable the terminal to initiate CS services such as voice services under LTE access, to receive paging of CS services such as voice, and to correctly process ongoing PS services of the terminal in the LTE network.

During the preliminary period of building a TD-LTE network, if an operator already has a mature UTRAN/GERAN network, the operator may adopt an existing CS voice solution to provide voice service in combination with a TD-LTE network deploy policy so as to protect CS investments, while the TD-LTE network merely processes data services (including IMS data services). In this case, when adopting the CSFB technology, i.e., when an UE under the coverage of LTE is processing voice services, the terminal first falls back to the CS network to process voice services in the CS network, which thereby achieves the objective of reusing the existing CS device to provide traditional voice services for subscribers in the TD-LTE network.

EPS/LTE standard TS23.018 have specified a CS fallback procedure over SGs and a procedure for Mobile Terminating Roaming Forward call (MTRF). However, in the EPS/LTE network, the method for charging the CS fallback MTRF call (including IMS messages) is still a pending issue.

SUMMARY OF THE INVENTION

The present invention provides a method, according to which, in CS fallback MTRF call of an EPS/LTE network, a mobile switching center (MSC) in a visited public land mobile network (VPLMN) would include CS fallback data, for example, charging data records (CDRs). The present method consolidates or aggregates these charging data records into a single mobile terminating call record.

An objective of the present invention is to provide a method and device for roaming charging for CS fallback MTRF call.

According to one aspect of the present invention, there is provided a method of roaming charging for a CS fallback MTRF call in a home charging device, wherein the method comprising the following steps:

a. receiving charging data records from at least one roaming charging device to obtain at least one charging data record, wherein a user equipment roams to a VPLMN corresponding to the at least one roaming charging device;

b. performing consolidation processing based on the at least one charging data record in combination with local charging data records in the home charging device to obtain a consolidated target charging data record.

According to another aspect of the present invention, there is further provided a method for facilitating roaming charging for MTRF call in a first roaming charging device of a first VPLMN, wherein the method comprises steps of:

A. generating a first charging data record based on first roaming related information of a user equipment in the first VPLMN;

B. sending the first charging data record to a home charging device corresponding to the user equipment;

wherein the first roaming related information comprises at least one of the following items:

number of a first mobile switching center corresponding to the first VPLMN;

CS fallback timestamp;

a first MSRN corresponding to the user equipment in the first VPLMN;

IMSI of the user equipment;

MSISDN of the user equipment;

calling party number;

call duration trunking information between a gateway mobile switching center and the first mobile switching center.

According to a further aspect of the present invention, there is further provided a method for facilitating roaming charging for MTRF call in a second roaming charging device of a second VPLMN, wherein a user equipment roams to the second VPLMN from a first VPLMN, wherein the method comprises steps of:

I. generating a second charging data record based on second roaming related information of the user equipment in the second VPLMN;

II. sending the second charging data record to a home charging device corresponding to the user equipment;

wherein the second roaming relevant information comprises at least one of the following items:

number of a second mobile switching center corresponding to the second VPLMN;

CS fallback timestamp;

CS fallback correlation identification:

a first MSRN corresponding to the user equipment in the first VPLMN;

a second MSRN corresponding to the user equipment in the second VPLMN;

IMSI of the user equipment;

MSISDN of the user equipment;

calling party number;

call duration;

trunking information between a first mobile switching center corresponding to the first VPLMN and the second mobile switching center.

According to a still further aspect of the present invention, there is further provided a home charging device for performing roaming charging for CS fallback MTRF call, wherein the device comprises:

a first charging obtaining module configured to receive charging data records from at least one roaming charging device to obtain at least one charging data record, wherein a user equipment roams to a VPLMN corresponding to the at least one roaming charging device;

a consolidation processing module configured to perform consolidation processing based on the at least one charging data record in combination with local charging data records in the home charging device to obtain a consolidated target charging data record.

According to a yet further aspect of the present invention, there is provided a first roaming charging device for facilitating performing roaming charging for MTRF call in a first VPLMN, wherein the device comprises:

a first charging generation module configured to generate a first charging data record based on first roaming related information of a user equipment in the first VPLMN;

a first charging sending module configured to send the first charging data record to a home charging device corresponding to the user equipment;

wherein the first roaming relevant information comprises at least one of the following items:
number of a first mobile switching center corresponding to the first VPLMN;
CS fallback timestamp;
a first MSRN corresponding to the user equipment in the first VPLMN;
IMSI of the user equipment;
MSISDN of the user equipment;
calling party number;
call duration
trunking information between a gateway mobile switching center and the first mobile switching center.

According to a further embodiment of the present invention, there is provided a second roaming charging device for facilitating roaming charging for MTRF call in a second VPLMN, wherein a user equipment roams to the second VPLMN from a first VPLMN, wherein the device comprises:

a second charging generation module configured to generate a second charging data record based on second roaming related information of the user equipment in the second VPLMN;

a second charging sending module configured to send the second charging data record to a home charging device corresponding to the user equipment;

wherein the second roaming relevant information comprises at least one of the following items:
number of a second mobile switching center corresponding to the second VPLMN;
CS fallback timestamp;
CS fallback correlation identification:
a first MSRN corresponding to the user equipment in the first VPLMN;
a second MSRN corresponding to the user equipment in the second VPLMN;
IMSI of the user equipment;
MSISDN of the user equipment;
calling party number;
call duration
trunking information between a first mobile switching center corresponding to the first VPLMN and the second mobile switching center.

According to still further aspect of the present invention, there is provided a system for performing roaming charging for CS fallback MTRF call, comprising the above home charging device, the above first roaming charging device, and the above second roaming charging device.

Compared with the prior art, the present invention introduces a novel method of computing charging data records so as to perform final charging in a home charging device in the home network, instead of performing final charging in a roaming charging device in a visited network, which guarantees that a terminal subscriber is correctly charged and avoids repetitive charging on the charging data records in the mobile switching center of the visited network.

BRIEF DESCRIPTION OF THE DRAWINGS

The other features, objectives, and advantages of the present invention will become more apparent through reading the detailed description of the non-limiting embodiments with reference to the accompany drawings as follows.

Same or similar reference signs in the accompanying drawings represent same or similar components.

DETAILED DESCRIPTION OF PREFERRED EMBODIMENTS

Hereinafter, the present invention will be further described in detail with reference to the accompanying drawings.

Figure 1:
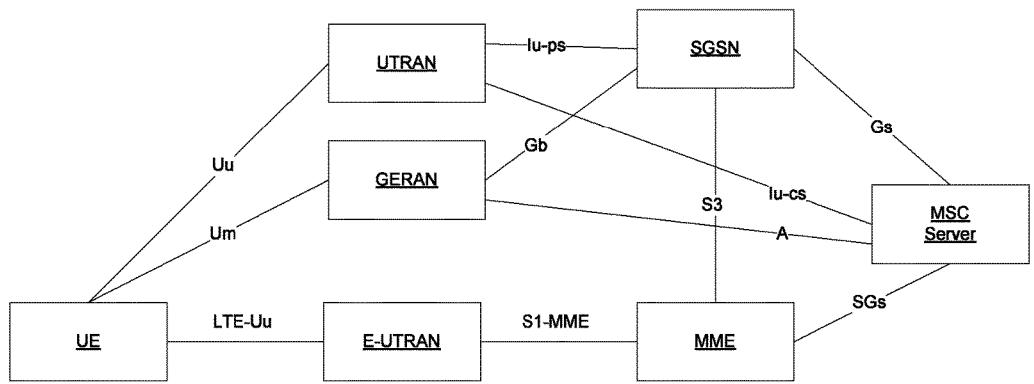
FIG. 1 shows a network system topology of roaming charging for CS fallback MTRF call according to one aspect of the present invention.

FIG. 1 shows a network system topology of roaming charging for CS fallback MTRF call according to another aspect of the present invention.

The CSFB (circuit switched fallback) can only be used at an overlapping coverage region between E-UTRAN/GERAN and in the case that a user equipment has a CSFB function.

The CSFB technology is implemented via an SGs interface. Between an MME (mobility management entity) and an MSC is an SGs interface similar to the Gs interface between the existing SGSN (service GPRS supporting node) and MSC. The SGs interface is for processing mobility management and paging procedures between an EPS and a CS. Such procedures are implemented by extending an existing Gs interface procedure.

A UE having a CSFB capability can not only access an EPC through E-UTRAN, but also can access to the CS through GERAN/UTRAN; therefore, it is required to support joint EPS/IMS attachment, update, and detachment procedures, as well as CSFB and SMS procedures when a CS service is used.

An MME is required to be capable of parsing out a VLR number from a default LAI or from a GUTI received from the UE; capable of maintaining an SGs correlation for the UE with joint EPS/IMS attachment; capable of initiating an IMS detachment upon EPS detachment; capable of initiating a paging procedure to eNode B when the MSC pages the UE because of a CS service; capable of supporting the SMS procedure in the case of CSFB; capable of rejecting a CSFB call request (due to O& M reason); in the case that multiple MSC/VLRs serve a same LAI, the MMS supporting CSFB can determine the VLR number using the Hash value obtained from LAI and IMSI.

The MSC can maintain the SGs correlation for the UE with EPS/IMSI joint attachment; page a subscriber at an SGs interface and an Iu/A interface in parallel, and support an SMS program in the case of CSFB.

The E-UTRAN is required to be capable of forwarding a paging request and an SMS to the UE and forwarding the UE to a cell in a target CS domain.

If multiple MSC/VLRs serve a same LAI, the SGSN supporting Gs would determine a VLR number using the Hash value obtained from the IMSI and the LAI.

Figure 2:
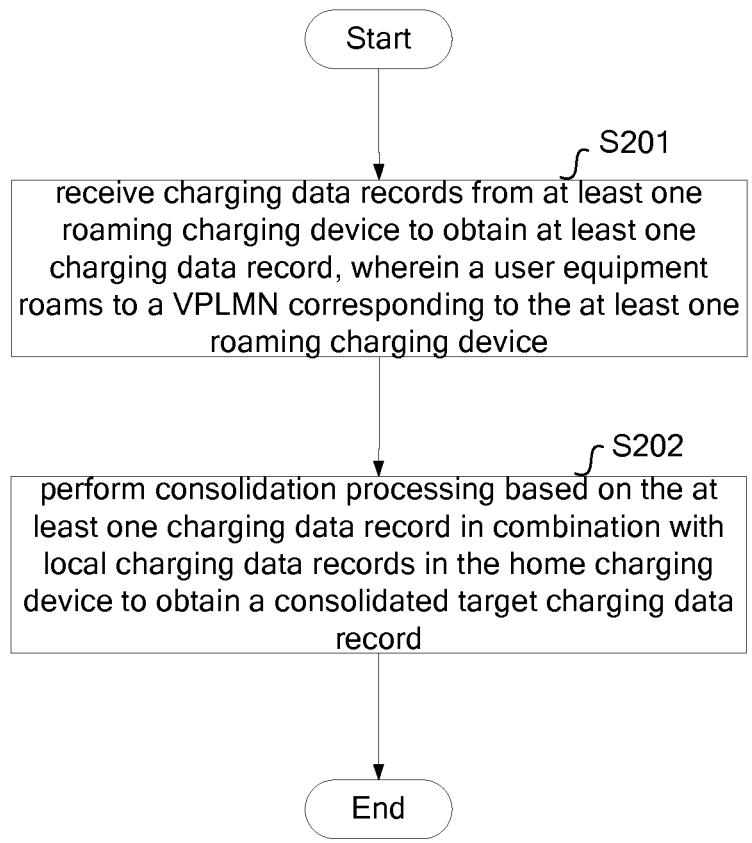
FIG. 2 shows a flowchart of a method for roaming charging for CS fallback MTRF call according to another aspect of the present invention.

FIG. 2 shows a flowchart of a method for roaming charging for CS fallback MTRF call according to one aspect of the present invention.

In step S201, a home charging device 1 receives charging data records from at least one roaming charging device to obtain at least one charging data record, wherein a user equipment roams to a VPLMN corresponding to the at least one roaming charging device. Specifically, the user equipment roams to a plurality of VPLMNs; each time when the user roams to a VPLMN, a roaming charging device in the VPLMN generates a charging data record based on roaming information of the user equipment, for example, generating a charging data record of the user equipment in the VPLMN based on a number of a mobile switching center (MSC) corresponding to the VPLMN, a CS fallback timestamp, a mobile station roaming number (MSRN) of the user equipment in the VPLMN, an international mobile subscriber identity (IMSI), a mobile station international ISDN number (MSISDN), a calling party number, call duration, trunking information between the gateway mobile switching center GMSC and the visited mobile switching center VMSC (e.g., incoming trunk number, i.e., VMSC trunk number on which the call originated, and outgoing trunk number, i.e., the trunk number on which the call left the VMSC), etc.; afterwards, the roaming charging device in the VPLMN sends the charging data record therein to the home charging device 1 corresponding to the user equipment; or, the latter roaming charging device sends the charging data record therein to the former charging device that consolidates its own charging data record with the charging data record of the latter charging device and then sends the consolidated charging data record to a roaming charging device preceding the former charging device, and so forth, till the earliest roaming charging device that further sends the consolidated charging data record to the home charging device 1. Here, the user equipment roams from the VPLMN corresponding to the earliest roaming charging device to the VPLMN corresponding to the latter roaming charging device one by one.

In step S202, the home charging device 1 performs consolidation processing based on the at least one charging data record in combination with the local charging data record in the home charging device so as to obtain a consolidated target charging data record.

Here, the local charging data record is the charging data record of the user equipment generated or obtained by the home charging device 1, for example, a charging data record generated based on a first MSRN number (the mobile station roaming number of the user equipment in a first VPLMN) and a first VMSC number (the number of the mobile switching center corresponding to a first VPLMN); or the local charging data record may also include the charging data record of the user equipment as sent from other roaming charging device and already obtained by the home charging device 1.

For example, suppose the user equipment first roams from a first VPLMN to the second VPLMN and then roams from the second VPLMN to a third VPLMN. The roaming charging devices in the three VPLMNs generate for the user equipment its charging data records in the three VPLMNs, respectively, and send the three charging data records to the home charging device 1 in the HPLMN (home public land mobile network) corresponding to the user equipment; the home land charging device 1 performs consolidation processing to the three charging data records in combination with the local charging data records in the home charging device 1, so as to obtain a consolidated target charging data record.

For another example, the roaming charging devices in the three VPLMNs generate for the user equipment its charging data records in the three VPLMNs, respectively. A third roaming charging device in the third VPLMN sends a third charging data record therein to a second roaming charging device in the second VPLMN; the second roaming charging device performs consolidation processing to the third charging data record and the second charging data record in the second roaming charging device to obtain a consolidated first candidate charging data record and send it to a first roaming charging device in a first VPLMN; the first roaming charging device further performs consolidation processing to the first candidate charging data record and the first charging data record in the first roaming charging device to obtain a consolidated second charging data record and send it to the home charging device 1 in HPLMN; the home charging device 1 further performs consolidation processing to the second candidate charging data record and the local charging data record in the home charging device 1 to obtain a consolidated target charging data record.

Figure 3:
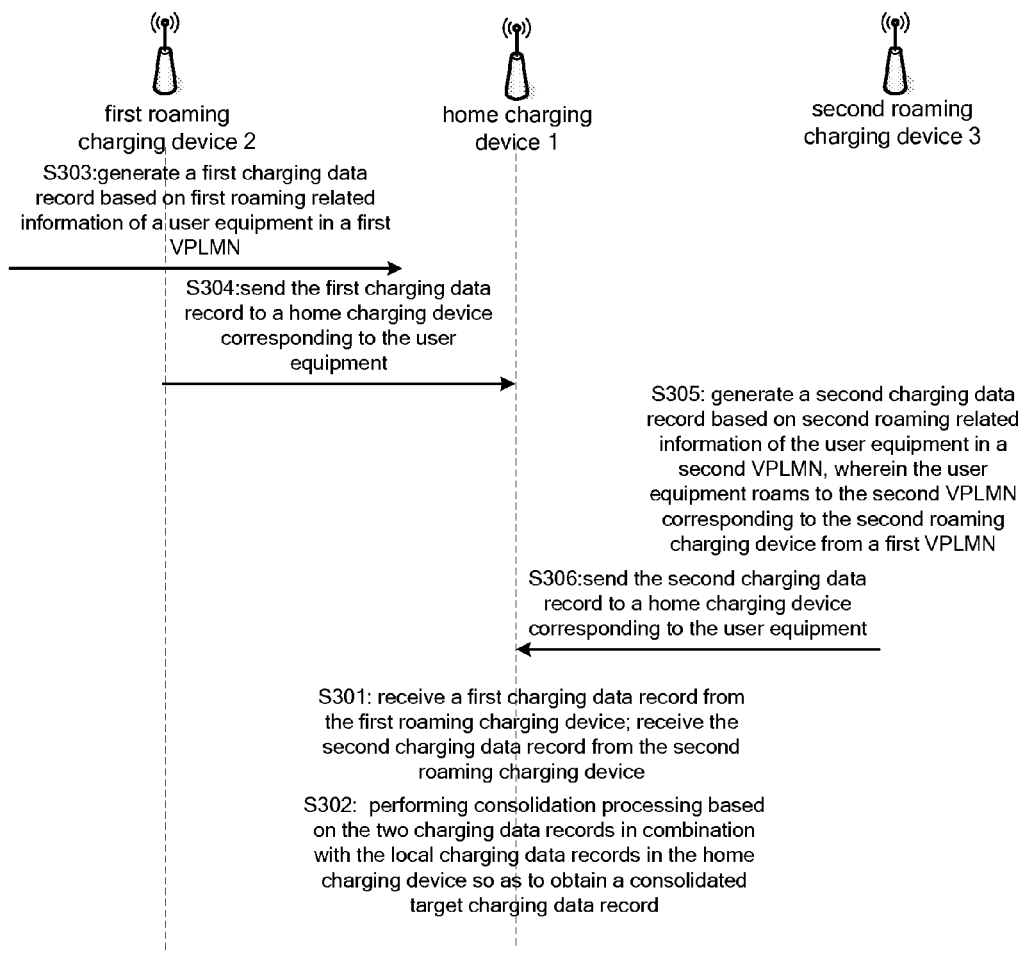
FIG. 3 shows a flowchart of a method for roaming charging for CS fallback MTRF call according to one preferred embodiment of the present invention.

FIG. 3 shows a flowchart of a method for roaming charging for a CS fallback MTRF call according to one preferred embodiment of the present invention. Here, the user equipment roams from HPLMN to a first VPLMN and further roams from the first VPLMN to a second VPLMN.

In step S303, the first roaming charging device 2 in the first VPLMN generates a first charging data record based on first roaming related information of the user equipment in the first VPLMN, for example, a first mobile switching center (MSC) number corresponding to the first VPLMN, a CS fallback timestamp, a first mobile station roaming number (a first MSRN) corresponding to the user equipment in the VPLMN, an international mobile subscriber identity (IMSI), a mobile station international ISDN number (MSISDN), a calling party number, call duration, trunk information between the gateway mobile switching center GMSC and the first mobile switching center VMSC (e.g., incoming trunk number, i.e., VMSC trunk number on which the call originated, and outgoing trunk number, i.e., the trunk number on which the call left the VMSC), etc.

Those skilled in the art should understand that the above first roaming related information is only exemplary; other existing first roaming related information or such information possibly evolved in the future, if applicable to the present invention, should also be included within the protection scope of the present invention and is incorporated here by reference.

In step S304, the first roaming charging device 2 sends the first charging data record to the home charging device 1 in HPLMN corresponding to the user equipment.

Afterwards, the user equipment roams to the second VPLMN from the first VPLMN. In step S305, the second roaming charging device 3 generates a second charging data record based on second roaming related information of the user equipment in the VLPMN2, for example, a second mobile switching center (MSC) number corresponding to the second VPLMN, a CS fallback timestamp, a CS fallback correlation ID, a first mobile station roaming number (a first MSRN) corresponding to the user equipment in the first VPLMN, a second mobile station roaming number (second MSRN) corresponding to the user equipment in the second VPLMN, an international mobile subscriber identity (IMSI), a mobile station international ISDN number (MSISDN), an incoming call number, call duration, trunk line information between the first mobile switching center (a first VMSC) corresponding to the first VPLMN and the second mobile switching center (second VMSC), etc.

Those skilled in the art should understand that the above second roaming related information is only exemplary; other existing second roaming related information or such information possibly evolved in the future, if applicable to the present invention, should also be included within the protection scope of the present invention and is incorporated here by reference.

In step S306, a second roaming charging device 3 sends the second charging data record to the home charging device 1 in HPLMN corresponding to the user equipment.

In step S301, the home charging device 1 receives a first charging data record from a first roaming charging device, wherein the user equipment roams to HPLMN1 corresponding to the first roaming charging device; receives a second charging data record from a second roaming charging device, wherein the user equipment roads to HPLMN2 corresponding to the second roaming charging device via the first VPLMN.

In step S302, the home charging device 1 performs consolidation processing based on the first charging data record and the second charging record in combination with the local charging data record in the home charging device, to obtain a consolidated target charging data record.

Figure 4:
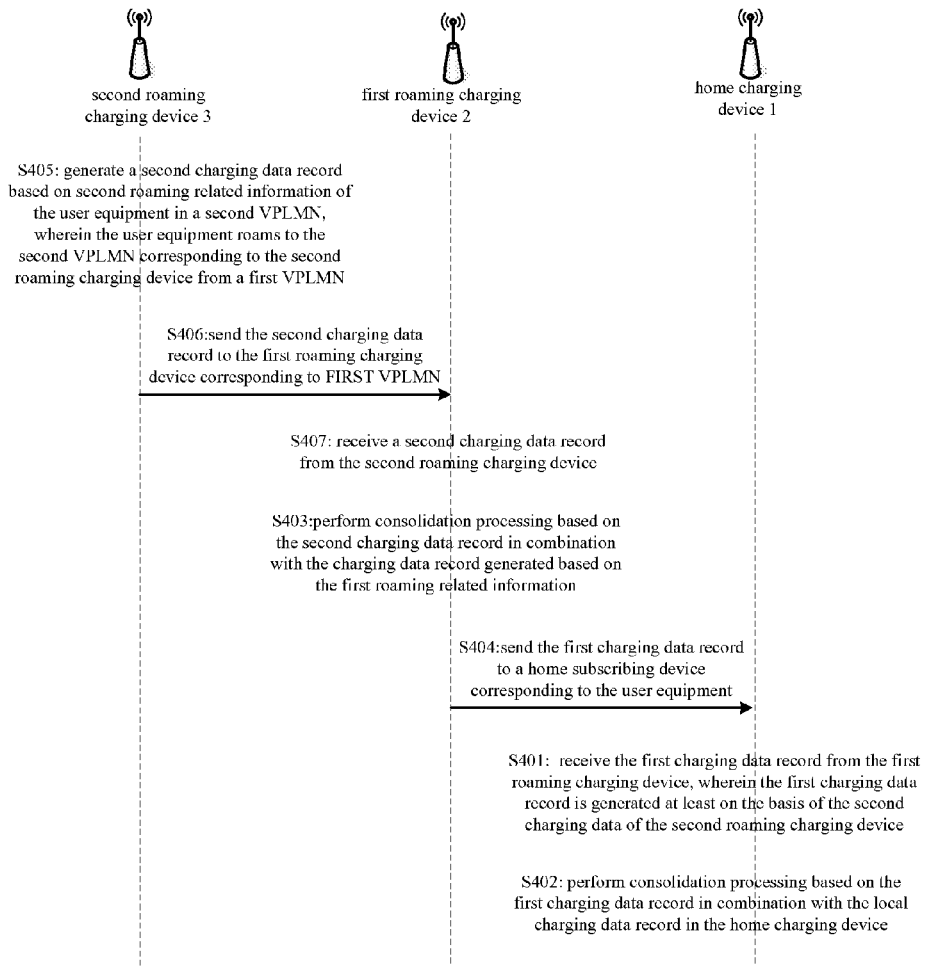
FIG. 4 shows a flowchart of a method for roaming charging for CS fallback MTRF call according to another preferred embodiment of the present invention.

FIG. 4 shows a flowchart of a method for roaming charging for CS fallback MTRF call according to another preferred embodiment of the present invention. Here, the user equipment roams to first VPLMN from HPLMN and further roams to second VPLMN from the first VPLMN.

In step S405, the second roaming charging device 3 generates a second charging data record based on second roaming related information in the second VPLMN, for example, a second mobile switching center MSC number corresponding to the second VPLMN, a CS fallback timestamp, a CS fallback correlation ID, a first mobile station roaming number (a first MSRN) corresponding to the user equipment in the first VPLMN, a second mobile station roaming number (a second MSRN) corresponding to the user equipment in the second VPLMN, an international mobile subscriber identity (IMSI), a mobile station international ISDN number (MSISDN), a calling party number, call duration, trunk information between the first mobile switching center (a first VMSC) corresponding to the first VPLMN and the second mobile switching center (second VMSC), etc.

In step S406, the second roaming charging device 3 sends the second charging data record to a first roaming charging device corresponding to the first VPLMN.

In step S407, the first roaming charging device 2 receives a second charging data record from the second roaming charging device 3, wherein the user equipment roams to the second VPLMN corresponding to the second roaming charging device from the first VPLMN, wherein the second charging data record comprises a second MSRN corresponding to the user equipment in the second VPLMN.

Afterwards, in step S403, based on the second charging data record, in combination with the charging data record generated based on the first roaming related information, for example, a first mobile switching center (MSC) number corresponding to the first VPLMN, a CS fallback timestamp, a first mobile station roaming number (a first MSRN) corresponding to the user equipment in the first VPLMN, an international mobile subscriber identity (IMSI), a mobile station international ISDN number (MSISDN), a calling party number, call duration, trunk information between the gateway mobile switching center GMSC and the first mobile switching center VMSC, etc., the first roaming charging device 2 performs consolidation processing to the second charging data record and the first roaming related information to obtain the first charging data record.

Next, in step S404, the first roaming charging device 2 sends the first charging data record to the home charging device 1 in the HPLMN corresponding to the user equipment.

In step S401, the home charging device 1 receives a first charging data record from a first roaming charging device 1, wherein the first charging data is generated at least on the basis of a second charging data record from a second roaming charging device, wherein the user equipment roams to a second VPLMN corresponding to the second roaming charging device from the first VPLMN corresponding to the first roaming charging device.

In step S402, the home charging device 1 performs consolidation processing based on the first charging data record and in combination with the local charging data record in the home charging device.

Figure 5:
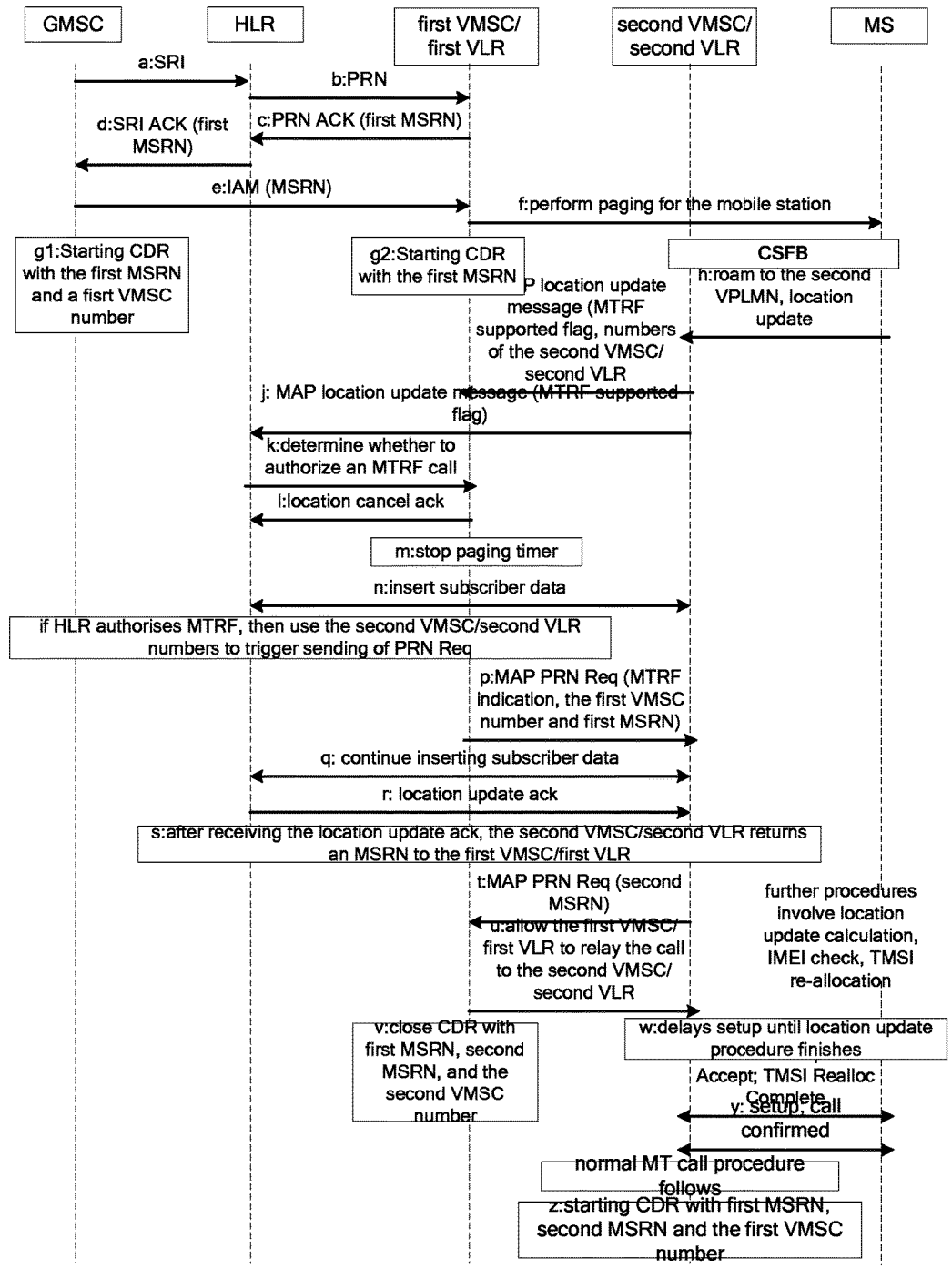
FIG. 5 shows a flowchart of a method for roaming charging for CS fallback MTRF call according to a further preferred embodiment of the present invention.

FIG. 5 shows a flowchart of a method for roaming charging for CS fallback MTRF call according to a further preferred embodiment of the present invention.

In step a, the gateway mobile switching center (GMSC) requests Sending Routing Information (SRI) based on an MSISDN (called number) carried by a call initiated by a user equipment or mobile station (MS) from a home location register (HLR) corresponding to a called mobile station;

In step b, the HLR requests a Provide Roaming Number (PRN) from a first Visitor Location Register (a first VLR) or a first mobile switching center (a first VMSC);

In step c, the first VLR writes a first mobile station roaming number (a first MSRN) of the called subscriber in a first VPLMN into a particular field of PRN ACK and sends it to the HLR;

In step d, the HLR further sends the first MSRN to the GMSC via SRI ACK;

In step e, the GMSC sends an initial address message IAM carrying MSRN to the first VMSC/first VLR;

In step f, the first VMSC/first VLR performs paging to the mobile station, and the CSFB procedure starts;

In step g1, the GMSC performs CDR charging for the mobile station based on the first MSRN obtained in step d and the number of the first VMSC;

In step g2, the first VMSC/first VLR performs CDR charging to the mobile station based on the first MSRN of the mobile station in the first VPLMN;

In step h, the mobile station roams to second VPLMN and updates its address information;

In step i, if the Location Update Request LUR contains a "CSMT" flag and a valid temporary mobile subscriber identity (TMSI) or original location area identity LAI (for example, not after restart of the first VLR), an MTRF-supported second mobile switching center (a second VMSC) or a second visitor location register (a second VLR) may include the MTRF-supported flag and the numbers of the second VMSC/second VLR in the MAP (Mobile Application Part) location update message sent to the first VMSC/first VLR;

In step j, the MTRF-supported second VMSC/second VLR includes an MTRF-supported flag in an MAP location update message and sends the MAP location update message to a home subscriber server HSS or HLR;

In step k, after receiving the MAP location update message including the MTRF-supported flag, the MTRF-supported HSS/HLR decides whether to authorize an MTRF call between the first VMSC and the second VMSC based on roaming agreements in the first VMSC and the second VMSC. If the MTRF is authorized, the HSS/HLR sends an MAP Location Cancel message to the first VMSC/first VLR, the MAP Location Cancel message including MTRF Supported and Authorized flag and number of the second VMSC/second VLR. If the MTRF is not authorized, the HSS/HLR sends the MAP Location Cancel message to the first VMSC/first VLR, the Location Cancel message including an MTRF Supported And Not Authorized flag;

In step 1, the first VMSC/first VLR sends a Location Cancel Confirmation message to the HLR;

In step m, when the first VMSC/first VLR receives the MAP Location Cancel message, if the first VMSC/first VLR is paging, and if the MAP Location Cancel message includes the MTRF Supported and Authorized flag, or if the MAP Location Cancel message includes neither the MTRF Supported and Authorized flag nor the MTRF Supported And Not Authorized flag but the first VMSC/first VLR had received the MTRF-supported flag before step h, the first VMSC/first VLR stops paging timer;

In step n, the HLR inserts subscriber data for the second VMSC/second VLR;

In step o, if the HLR authorizes the MTRF, it uses the numbers of second VMSC/second VLR to send a PRN request. Specifically, if the HLR supports MTRF and decides to apply the MTRF based on the local operator policy and roaming agreements with the HSS/HLR and the second VMSC, it sends a MAP PRN request to the second VLR, the PRN request including the MTRF identifier, the first MSRN and parameters in the MAP PRN as received from the HSS/HLR;

In step p, the second VMSC/second VLR receives the MAP PRN request, the request comprising the MTRF identifier, numbers of first VMSC/first MSRN; the second VMSC/second VLR may check the roaming agreements with the HLR and the first VMSC for MTRF;

In step q, the HLR continues inserting subscriber data for the second VMSC/second VLR;

In step r, the HLR sends a location update acknowledgement to the second VMSC/second VLR;

In step s, after receiving the location update acknowledgement, the second VMSC/second VLR sends an MSRN to the first VMSC/first VLR. Specifically, if the second VMSC/second VLR accepts the MAP PRN request, after it successfully completes the MAP location update procedure with the HLR, the second VMSC/second VLR allocates the MSRN to allow routing the call from the first VMSC/first VLR to the second VMSC/second VLR. As an alternative embodiment, the second VMSC/second VLR may allocate the MSRN before completing the MAP update location procedure with the HLR;

In step t, the second VMSC/second VLR sends the second MSRN to the first VMSC/first VLR through the MAP PRN request; after receiving the MSRN from the second VMSC/second VLR, the first VMSC/first VLR stops any ongoing charging;

In step u, after receiving the second MSRN from the second VMSC/second VLR, it allows the first VMSC/first VLR to relay the call to the second VMSC/second VLR; the first VMSC/first VLR closes the data required for the charging data records, including the first MSRN and the second MSRN and the numbers of the second VMSC/second VLR;

In step v, the first VMSC/first VLR closes the CDR based on the first MSRN, the second MSRN and the number of second VMSC;

Further procedures involve to location update calculation, IMEI check, and TMSI re-allocation, etc.;

In step w, if the IAM message is received before completion of the mobile station's location update procedure, the second VMSC/second VLR may delay the setup of the call till the completion of the location update procedure, or at once a normal terminating call procedure starts; in a more common circumstance, if the location update is received with a "follow-on" indication, and if the second VMSC/second VLR supports the "follow-on" indication, the IAM may be handled as a waiting call or forwarded as Busy (CFB), which depends on the state of the "follow-on" call and the subscriber's subscription data; a Location Update Accept message may be sent to the mobile station at any time after receiving the MAP location update acknowledgement from the HLR, i.e., the location update procedure with the mobile station is not affected by the mobile station roaming forward procedure;

In step x, the second VMSC/second VLR sends the Location Update Receive message to the mobile station, thereby completing a TMSI re-allocation;

In step y, the second VMSC/second VLR establishes a call with the mobile station;

Next, a standard MT mobile terminated call procedure starts;

In step z, the second VMSC/second VLR starts CDR charging based on the first MSRN, the second MSRN, and the number of the first VMSC;

When the MTRF CS fallback call terminates, the second VMSC closes the CDR and sends it to the first VMSC; the first VMSC performs consolidation to the CDR sent by the second VMSC and the CDR in the first VMSC (correlation and integration) based on the MSRN and the MSC trunk line/number; the first VMSC further sends the consolidated CDR to the home charging device 1 in the HPLMN, the home charging device 1 including the CDR generated based on the first MSRN and the number of first VMSC. The home charging device 1 then performs consolidation processing to the CDR and the local CDR in the home charging device 1 so as to generate a target CDR for the subscriber.

Alternatively, the first VMSC and the second VMSC can directly send the CDR thereon to the home charging device 1 for charging. The home charging device 1 is associated with the MSC identity, first MSRN, second MSRN so as to perform charging for the multiple routing paths.

Figure 6:
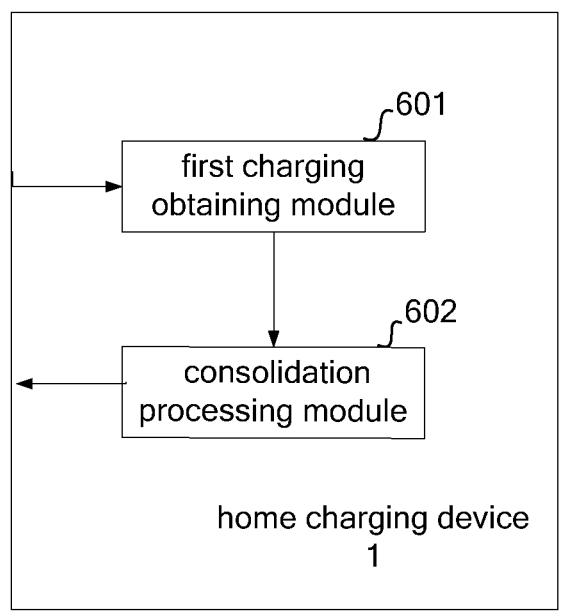
FIG. 6 shows a diagram of a device for roaming charging for CS fallback MTRF call according to anther aspect of the present invention.

FIG. 6 shows a diagram of a device for roaming charging for CS fallback MTRF call according to anther aspect of the present invention. The home charging device 1 comprises a first charging obtaining module 601, a consolidation processing module 602.

The first charging obtaining module 601 of the home charging device 1 receives charging data records from at least one roaming charging device to obtain at least one charging data record, wherein a user equipment roams to a VPLMN corresponding to the at least one roaming charging device. Specifically, the user equipment roams to a plurality of VPLMNs; each time when the user roams to a VPLMN, a roaming charging device in the VPLMN generates a charging data record based on roaming information of the user equipment, for example, generating a charging data record of the user equipment in the VPLMN based on a number of a mobile switching center (MSC) corresponding to the VPLMN, a CS fallback timestamp, a mobile station roaming number (MSRN) of the user equipment in the VPLMN, an international mobile subscriber identity (IMSI), a mobile station international ISDN number (MSISDN), a calling party number, call duration, trunking information between the GMSC and VMSC (e.g., incoming trunk number, i.e., VMSC trunk number on which the call originated, and outgoing trunk number, i.e., the trunk number on which the call left the VMSC), etc.; afterwards, the roaming charging device in the VPLMN sends the charging data record therein to the home charging device 1 corresponding to the user equipment; or, the latter roaming charging device sends the charging data record therein to the former charging device that consolidates its own charging data record with the charging data record of the latter charging device and then sends the consolidated charging data record to a roaming charging device preceding the former charging device, and so forth, till the earliest roaming charging device that further sends the consolidated charging data record to the home charging device 1. Here, the user equipment roams from the VPLMN corresponding to the earliest roaming charging device to the VPLMN corresponding to the latter roaming charging device one by one.

The consolidation processing module 602 of the home charging device 1 performs consolidation processing based on the at least one charging data record in combination with the local charging data record in the home charging device so as to obtain a consolidated target charging data record.

Here, the local charging data record is the charging data record generated or obtained by the home charging device 1, for example, a charging data record generated based on a first MSRN number (the mobile station roaming number of the user equipment in a first VPLMN) and a first VMSC number (the number of the mobile switching center corresponding to a first VPLMN); or the local charging data record may also include the charging data record as sent from other roaming charging device and already obtained by the home charging device 1.

For example, suppose the user equipment first roams from a first VPLMN to the second VPLMN and then roams from the second VPLMN to a third VPLMN. The roaming charging devices in the three VPLMNs generate for the user equipment its charging data records in the three VPLMNs, respectively, and send the three charging data records to the home charging device 1 in the HPLMN (home public land mobile network) corresponding to the user equipment; the home land charging device 1 performs consolidation processing to the three charging data records in combination with the local charging data records in the home charging device 1, so as to obtain a consolidated target charging data record.

For another example, the roaming charging devices in the three VPLMNs generate for the user equipment its charging data records in the three VPLMNs, respectively. A third roaming charging device in the third VPLMN sends a third charging data record therein to a second roaming charging device in the second VPLMN; the second roaming charging device performs consolidation processing to the third charging data record and the second charging data record in the second roaming charging device to obtain a consolidated first candidate charging data record and send it to a first roaming charging device in a first VPLMN; the first roaming charging device further performs consolidation processing to the first candidate charging data record and the first charging data record in the first roaming charging device to obtain a consolidated second charging data record and send it to the home charging device 1 in HPLMN; the home charging device 1 further performs consolidation processing to the second candidate charging data record and the local charging data record in the home charging device 1 to obtain a consolidated target charging data record.

Figure 7:
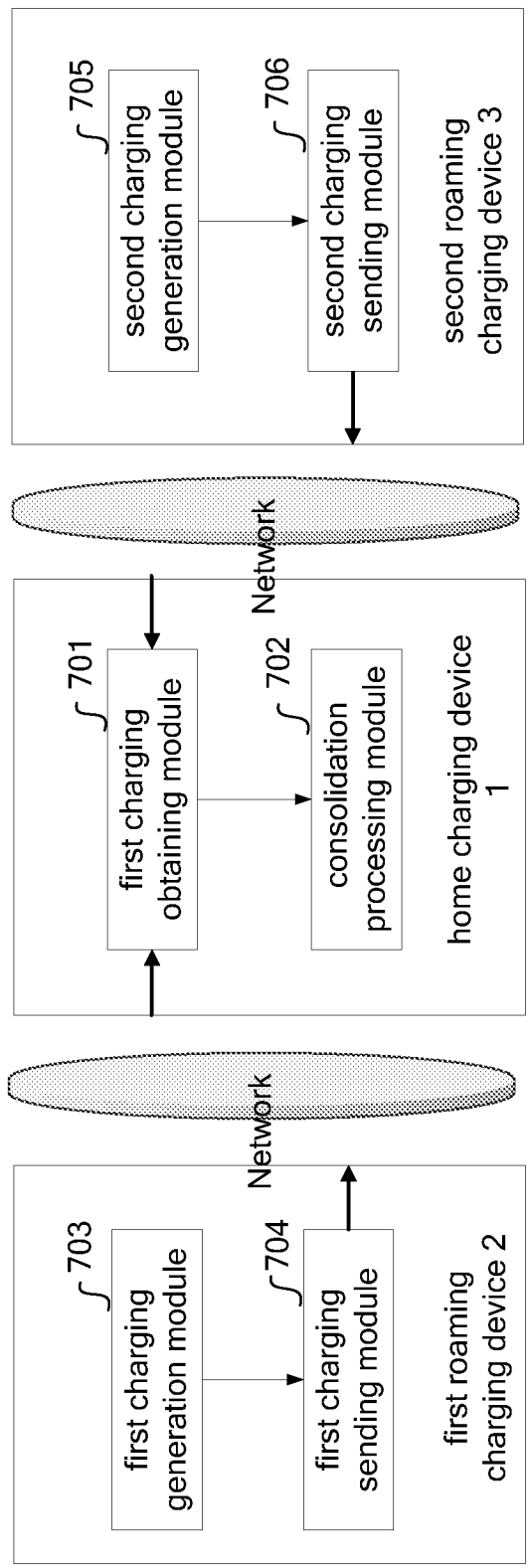
FIG. 7 shows a diagram of a device for roaming charging for CS fallback MTRF call according to one preferred embodiment of the present invention.

FIG. 7 shows a diagram of a device for roaming charging for CS fallback MTRF call according to one preferred embodiment of the present invention. Here, the user equipment roams from HPLMN to a first VPLMN and further roams from the first VPLMN to a second VPLMN. The home charging device 1 comprises a first charging obtaining module 701, a consolidation processing module 702; the first roaming charging device 2 comprises a first charging generation module 703, a first charging sending module 704; the second roaming charging device 3 comprises a second charging generation module 705, a second charging sending module 706.

The first charging generation module 703 of the first roaming charging device 2 in the first VPLMN generates a first charging data record based on first roaming related information of the user equipment in the first VPLMN, for example, a first mobile switching center (MSC) number corresponding to the first VPLMN, a CS fallback timestamp, a first mobile station roaming number (a first MSRN) corresponding to the user equipment in the VPLMN, an international mobile subscriber identity (IMSI), a mobile station international ISDN number (MSISDN), a calling party number, call duration, trunk information between the gateway mobile switching center GMSC and the first mobile switching center VMSC (e.g., incoming trunk number, i.e., VMSC trunk number on which the call originated, and outgoing trunk number, i.e., the trunk number on which the call left the VMSC), etc.

Those skilled in the art should understand that the above first roaming related information is only exemplary; other existing first roaming related information or such information possibly evolved in the future, if applicable to the present invention, should also be included within the protection scope of the present invention and is incorporated here by reference.

The first charging sending module 704 of the first roaming charging device 2 sends the first charging data record to the home charging device 1 in HPLMN corresponding to the user equipment.

Afterwards, the user equipment roams to the second VPLMN from the first VPLMN. The second charging generation module 705 of the second roaming charging device 3 generates a second charging data record based on second roaming related information of the user equipment in the VLPMN2, for example, a second mobile switching center (MSC) number corresponding to the second VPLMN, a CS fallback timestamp, a CS fallback correlation ID, a first mobile station roaming number (a first MSRN) corresponding to the user equipment in the first VPLMN, a second mobile station roaming number (second MSRN) corresponding to the user equipment in the second VPLMN, an international mobile subscriber identity (IMSI), a mobile station international ISDN number (MSISDN), an incoming call number, call duration, trunk line information between the first mobile switching center (a first VMSC) corresponding to the first VPLMN and the second mobile switching center (second VMSC), etc.

Those skilled in the art should understand that the above second roaming related information is only exemplary; other existing second roaming related information or such information possibly evolved in the future, if applicable to the present invention, should also be included within the protection scope of the present invention and is incorporated here by reference.

The second charging sending module 706 of the second roaming charging device 3 sends the second charging data record to the home charging device 1 in HPLMN corresponding to the user equipment.

The first charging obtaining module 701 of the home charging device 1 receives a first charging data record from a first roaming charging device, wherein the user equipment roams to HPLMN1 corresponding to the first roaming charging device; receives a second charging data record from a second roaming charging device, wherein the user equipment roads to HPLMN2 corresponding to the second roaming charging device via the first VPLMN.

The consolidation processing module 702 of the home charging device 1 performs consolidation processing based on the first charging data record and the second charging record in combination with the local charging data record in the home charging device, to obtain a consolidated target charging data record.

Figure 8:
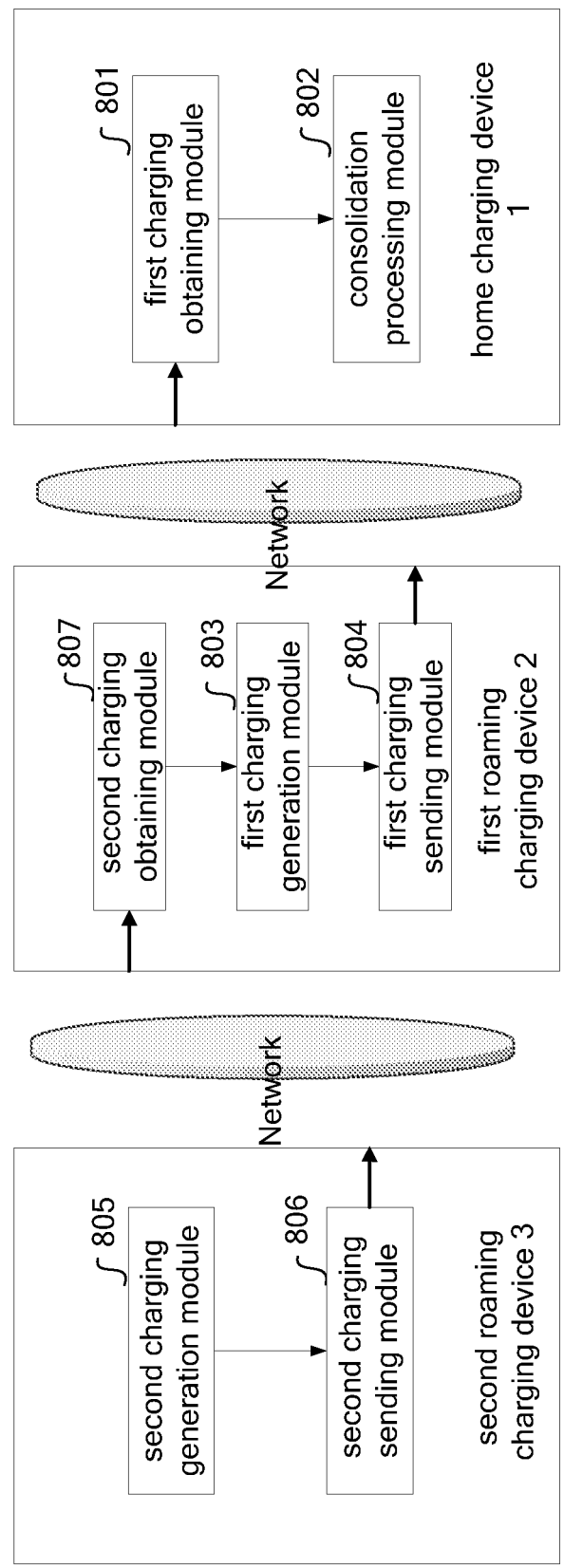
FIG. 8 shows a diagram of a device for roaming charging for CS fallback MTRF call according to a further embodiment of the present invention.

FIG. 8 shows a diagram of a device for roaming charging for CS fallback MTRF call according to a further embodiment of the present invention. Here, the user equipment roams to first VPLMN from HPLMN and further roams to second VPLMN from the first VPLMN. The home charging device 1 comprises a first charging obtaining module 801, a consolidation processing module 802; the first roaming charging device 2 comprises a first charging generation module 803, a first charging sending module 804, a second charging obtaining module 807; the second roaming charging device 3 comprises a second charging generation module 805, a second charging sending module 806.

The second charging generation module 805 of the second roaming charging device 3 generates a second charging data record based on second roaming related information in the second VPLMN, for example, a second mobile switching center MSC number corresponding to the second VPLMN, a CS fallback timestamp, a CS fallback correlation ID, a first mobile station roaming number (a first MSRN) corresponding to the user equipment in the first VPLMN, a second mobile station roaming number (a second MSRN) corresponding to the user equipment in the second VPLMN, an international mobile subscriber identity (IMSI), a mobile station international ISDN number (MSISDN), a calling party number, call duration, trunk information between the first mobile switching center (a first VMSC) corresponding to the first VPLMN and the second mobile switching center (second VMSC), etc.

The second charging sending module 806 of the second roaming charging device 3 sends the second charging data record to a first roaming charging device corresponding to the first VPLMN.

The second charging obtaining module 807 of the first roaming charging device 2 receives a second charging data record from the second roaming charging device 3, wherein the user equipment roams to the second VPLMN corresponding to the second roaming charging device from the first VPLMN, wherein the second charging data record comprises a second MSRN corresponding to the user equipment in the second VPLMN.

Afterwards, based on the second charging data record, in combination with the charging data record generated based on the first roaming related information, for example, a first mobile switching center (MSC) number corresponding to the first VPLMN, a CS fallback timestamp, a first mobile station roaming number (a first MSRN) corresponding to the user equipment in the first VPLMN, an international mobile subscriber identity (IMSI), a mobile station international ISDN number (MSISDN), a calling party number, call duration, trunk information between the gateway mobile switching center GMSC and the first mobile switching center VMSC, etc., the first charging generation module 803 of the first roaming charging device 2 performs consolidation processing to the second charging data record and the first roaming related information to obtain the first charging data record.

Next, the first charging sending module 804 of the first roaming charging device 2 sends the first charging data record to the home charging device 1 in the HPLMN corresponding to the user equipment.

The first charging obtaining module 801 of the home charging device 1 receives a first charging data record from a first roaming charging device 1, wherein the first charging data is generated by a second charging data record comprising a second roaming charging device, wherein the user equipment roams to a second VPLMN corresponding to the second roaming charging device from the first VPLMN corresponding to the first roaming charging device.

The consolidation processing module 802 of the home charging device 1 performs consolidation processing based on the first charging data record and in combination with the local charging data record in the home charging device.

To those skilled in the art, it is apparent that the present invention is not limited to the details of above exemplary embodiments, and the present invention can be implemented with other specific embodiments without departing the spirit or basic features of the present invention. Thus, from any perspective, the embodiments should be regarded as illustrative and non-limiting. The scope of the present invention is limited by the appended claims, instead of the above description. Thus, meanings of equivalent elements falling within the claims and all variations within the scope are intended to be included within the present invention. Any reference numerals in the claims should be regarded as limiting the involved claims. Besides, it is apparent that such terms as "comprise" and "include" do not exclude other units or steps, and a single form does not exclude a plural form. The multiple units or modules as stated in apparatus claims can also be implemented by a single unit or module through software or hardware. Terms such as first and second are used to represent names, not representing any specific sequence.

What is claimed is:

1. A method of charging a subscriber to a Public Land Mobile Network (PLMN), wherein the method comprises:
receiving charging data records from at least one roaming charging device at a home charging device in a Home PLMN (HPLMN) to obtain at least one charging data record for a Circuit Switched Fallback (CSFB) Mobile Terminating Roaming Forwarding (MTRF) call associated with a user equipment corresponding to a subscriber to the HPLMN, wherein the user equipment roams to a Visited PLMN (VPLMN) corresponding to the at least one roaming charging device during the CSFB MTRF call;
performing consolidation processing based on the at least one charging data record in combination with local charging data records in the home charging device to obtain a consolidated target charging data record for the CSFB MTRF call;
receiving a first charging data record from a first roaming charging device, wherein the user equipment roams to a first VPLMN corresponding to the first roaming charging device; and
receiving a second charging data record from a second roaming charging device, wherein the user equipment roams to a second VPLMN corresponding to the second roaming charging device from the first VPLMN.

2. A method for facilitating charging a subscriber to a Public Land Mobile Network (PLMN), wherein the method comprises:
generating a first charging data record at a first roaming charging device of a first Visited PLMN (VPLMN) based on first roaming related information for a Circuit Switched Fallback (CSFB) Mobile Terminating Roaming Forwarding (MTRF) call associated with a user equipment in the first VPLMN, wherein the user equipment corresponds to a subscriber to a Home PLMN (HPLMN); and
sending the first charging data record to a home charging device in the HPLMN;
wherein the first roaming related information comprises at least one of the following items:
a number of a first mobile switching center corresponding to the first VPLMN;
a CSFB timestamp;
a first Mobile Station Roaming Number (MSRN) corresponding to the user equipment in the first VPLMN;
an International Mobile Subscriber Identity (IMSI) of the user equipment;
a Mobile Station International Integrated Services Digital Network (MSISDN) of the user equipment;
a calling party number;
a call duration; and
trunking information between a gateway mobile switching center and the first mobile switching center;
the method further comprising:
receiving a second charging data record from a second roaming charging device, wherein the user equipment roams to a second VPLMN corresponding to the second roaming charging device from the first VPLMN, wherein the second charging data record comprises a second MSRN corresponding to the user equipment in the second VPLMN;
wherein the generating of the first charging data record includes performing consolidation processing based on the second charging data record in combination with the first roaming related information to obtain the first charging data record.

3. A method for facilitating charging a subscriber to a Public Land Mobile Network (PLMN), wherein the method comprises:
generating a second charging data record at a second roaming charging device of a second Visited PLMN (VPLMN) based on second roaming related information for a Circuit Switched Fallback (CSFB) Mobile Terminating Roaming Forwarding (MTRF) call associated with a user equipment in the second VPLMN, wherein the user equipment corresponds to a subscriber to a Home PLMN (HPLMN), wherein the user equipment roams to the second VPLMN from a first VPLMN during the CSFB MTRF call; and
sending the second charging data record toward a home charging device in the HPLMN;
wherein the second roaming relevant information comprises at least one of the following items:
a number of a second mobile switching center corresponding to the second VPLMN;
a CSFB timestamp;
a CSFB correlation identification;
a first Mobile Station Roaming Number (MSRN) corresponding to the user equipment in the first VPLMN;
a second MSRN corresponding to the user equipment in the second VPLMN;
an International Mobile Subscriber Identity (IMSI) of the user equipment;
a Mobile Station International Integrated Services Digital Network (MSISDN) of the user equipment;
a calling party number;
a call duration; and
trunking information between a first mobile switching center corresponding to the first VPLMN and the second mobile switching center;
wherein the second charging data record is sent from the second roaming charging device to at least one of the home charging device in the HPLMN and a first roaming charging device in the first VPLMN.

4. A home charging device for a Home Public Land Mobile Network (HPLMN), wherein the home charging device comprises:
a first receiver configured to receive charging data records from at least one roaming charging device to obtain at least one charging data record for a Circuit Switched Fallback (CSFB) Mobile Terminating Roaming Forwarding (MTRF) call associated with a user equipment corresponding to a subscriber to the HPLMN, wherein the user equipment roams to a Visited Public Land Mobile Network (VPLMN) corresponding to the at least one roaming charging device during the CSFB MTRF call; and
a processor configured to perform consolidation processing based on the at least one charging data record in combination with local charging data records in the home charging device to obtain a consolidated target charging data record for the CSFB MTRF call;
wherein the first receiver is configured to receive a first charging data record from a first roaming charging device, wherein the user equipment roams to a first VPLMN corresponding to the first roaming charging device during the CSFB MTRF call;
wherein the first receiver is configured to receive a second charging data record from a second roaming charging device, wherein the user equipment roams to a second VPLMN corresponding to the second roaming charging device from the first VPLMN during the CSFB MTRF call.

5. A first roaming charging device for a first Visited Public Land Mobile Network (VPLMN), wherein the first roaming charging device comprises:
   a charging generator configured to generate a first charging data record based on first roaming related information for a Circuit Switched Fallback (CSFB) Mobile Terminating Roaming Forwarding (MTRF) call associated with a user equipment in the first VPLMN, wherein the user equipment corresponds to a subscriber to a Home PLMN (HPLMN); and
   a transmitter configured to send the first charging data record to a home charging device in the HPLMN;
   wherein the first roaming relevant information comprises at least one of the following items:
   a number of a first mobile switching center corresponding to the first VPLMN;
   a CSFB timestamp;
   a first Mobile Station Roaming Number (MSRN) corresponding to the user equipment in the first VPLMN;
   an International Mobile Subscriber Identity (IMSI) of the user equipment;
   a Mobile Station International Integrated Services Digital Network (MSISDN) of the user equipment;
   a calling party number;
   a call duration; and
   trunking information between a gateway mobile switching center and the first mobile switching center;
   the first roaming charging device further comprising:
   a second receiver configured to receive a second charging data record from a second roaming charging device, wherein the user equipment roams to a second VPLMN corresponding to the second roaming charging device, wherein the second charging data record comprises a second MSRN corresponding to the user equipment in the second VPLMN;
   wherein the charging generator is configured to perform consolidation processing based on the second charging data record in combination with the first roaming related information to obtain the first charging data record.

6. A second roaming charging device for a second Visited Public Land Mobile Network (VPLMN), wherein the second roaming charging device comprises:
   a second charging generator configured to generate a second charging data record based on second roaming related information for a Circuit Switched Fallback (CSFB) Mobile Terminating Roaming Forwarding (MTRF) call associated with a user equipment in the second VPLMN, wherein the user equipment corresponds to a subscriber to a Home PLMN (HPLMN), wherein the user equipment roams to the second VPLMN from a first VPLMN during the CSFB MTRF call;
   a second transmitter configured to send the second charging data record toward a home charging device in the HPLMN;
   wherein the second roaming relevant information comprises at least one of the following items:
   a number of a second mobile switching center corresponding to the second VPLMN;
   a CSFB timestamp;
   a CSFB correlation identification:
   a first Mobile Station Roaming Number (MSRN) corresponding to the user equipment in the first VPLMN;
   a second MSRN corresponding to the user equipment in the second VPLMN;
   an International Mobile Subscriber Identity (IMSI) of the user equipment;
   a Mobile Station International Integrated Services Digital Network (MSISDN) of the user equipment;
   a calling party number;
   a call duration; and
   trunking information between a first mobile switching center corresponding to the first VPLMN and the second mobile switching center;
   wherein the second transmitter is configured to send the second charging data record to at least one of the home charging device in the HPLMN and a first roaming charging device in the first VPLMN.

7. A method of charging a subscriber to a Public Land Mobile Network (PLMN), wherein the method comprises:
   receiving charging data records from at least one roaming charging device at a home charging device in a Home PLMN (HPLMN) to obtain at least one charging data record for a Circuit Switched Fallback (CSFB) Mobile Terminating Roaming Forwarding (MTRF) call associated with a user equipment corresponding to a subscriber to the HPLMN, wherein the user equipment roams to a Visited PLMN (VPLMN) corresponding to the at least one roaming charging device during the CSFB MTRF call; and
   performing consolidation processing based on the at least one charging data record in combination with local charging data records in the home charging device to obtain a consolidated target charging data record for the CSFB MTRF call;
   receiving a first charging data record from a first roaming charging device, wherein the first charging data record is generated at least on the basis of a second charging data record from a second roaming charging device, wherein the user equipment roams to a second VPLMN corresponding to the second roaming charging device from a first VPLMN corresponding to the first roaming charging device.

8. A home charging device for a Home Public Land Mobile Network (HPLMN), wherein the home charging device comprises:
   a first receiver configured to receive charging data records from at least one roaming charging device to obtain at least one charging data record for a Circuit Switched Fallback (CSFB) Mobile Terminating Roaming Forwarding (MTRF) call associated with a user equipment corresponding to a subscriber to the HPLMN, wherein the user equipment roams to a Visited Public Land Mobile Network (VPLMN) corresponding to the at least one roaming charging device during the CSFB MTRF call; and
   a processor configured to perform consolidation processing based on the at least one charging data record in combination with local charging data records in the home charging device to obtain a consolidated target charging data record for the CSFB MTRF call;
   wherein the first receiver is configured to receive a first charging data record from a first roaming charging device, wherein the first charging data record is generated at least on the basis of a second charging data record from a second roaming charging device, wherein the user equipment roams to a second VPLMN corresponding to the second roaming charging device from a first VPLMN corresponding to the first roaming charging device.

* * * * *